Oct. 10, 1944.  M. MEYERBACH  2,360,070

SAW PARTICULARLY FOR METALS

Filed Sept. 17, 1943  4 Sheets-Sheet 1

INVENTOR.
MAX MEYERBACH
BY
ATTORNEY.

Oct. 10, 1944. M. MEYERBACH 2,360,070
SAW, PARTICULARLY FOR METALS
Filed Sept. 17, 1943 4 Sheets-Sheet 2

INVENTOR.
MAX MEYERBACH
BY
ATTORNEY.

Oct. 10, 1944.   M. MEYERBACH   2,360,070
SAW PARTICULARLY FOR METALS
Filed Sept. 17, 1943   4 Sheets-Sheet 3

INVENTOR.
MAX MEYERBACH
BY
ATTORNEY.

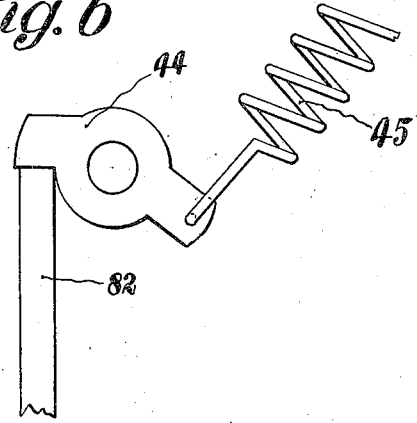
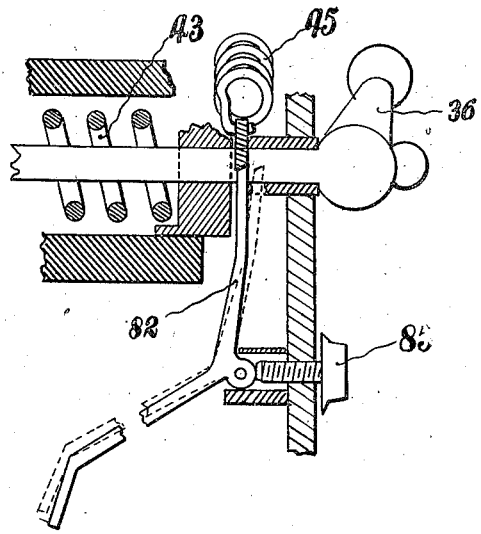

Patented Oct. 10, 1944

2,360,070

UNITED STATES PATENT OFFICE 2,360,070

SAW, PARTICULARLY FOR METALS

Max Meyerbach, New York, N. Y., assignor to Loma Machine Mfg. Co. Inc., New York, N. Y.

Application September 17, 1943, Serial No. 502,766

12 Claims. (Cl. 29—69)

The invention relates to a saw for cutting metals and particularly metal stock of a longitudinal shape, such as billets, rods and structural profiles.

In machines of this type sometimes rotary cutters are provided, and it has been found advisable to mount these rotary cutters or saw blades on the one end of the tiltable arm; the up and down stroke of the arm is frequently effected by a hydraulic feed cylinder.

The vise for clamping the articles is actuated by the hydraulic pressure system used for the movement of the tiltable arm; controlling means are provided to assure proper cooperation of the cutter and the vise.

It is the object of this invention to generally improve the operation of this type cutters and particularly to provide means by which the saw blade may be advanced towards and through the stock with the greatest admissible speed.

It is an important object of the invention to completely avoid vibrations during the operation of the cutter and to hereby secure a neat smooth cut.

It is another object of the invention to effect the return stroke of the tilting arm with the greatest possible speed.

It is also an object of the invention to safeguard the operation of the saw against excessive pressure and eliminate the damaging influence thereof.

It is another object of the invention to harmonize the hydraulic pressure imparted to the cutter with the varying cross-sections of the stock under treatment and to regulate the cutting speed.

It is an important object of the invention to properly control and to limit the down or work, and the up or return stroke of the tiltable arm.

It is also an object of the invention to provide means by which the stock to be severed is tightly gripped before the down stroke of the cutter commences.

It is a further object of the invention to provide means by which the last phase of the return stroke of the tilting arm is dampened.

It is another object of the invention to provide means which release the stock only after the cut has been completed and the saw has been moved out of contact with the workpiece.

It is one of the objects of the invention to provide means by which a maximum of operating safety is obtained.

The invention also includes certain improvements with regard to the automatic control of the cutting and clamping operation and of the transport of the stock through the machine.

With these and other objects in view which will become apparent as this description proceeds, the invention is illustrated by way of example in the accompanying drawings.

Figure 1:
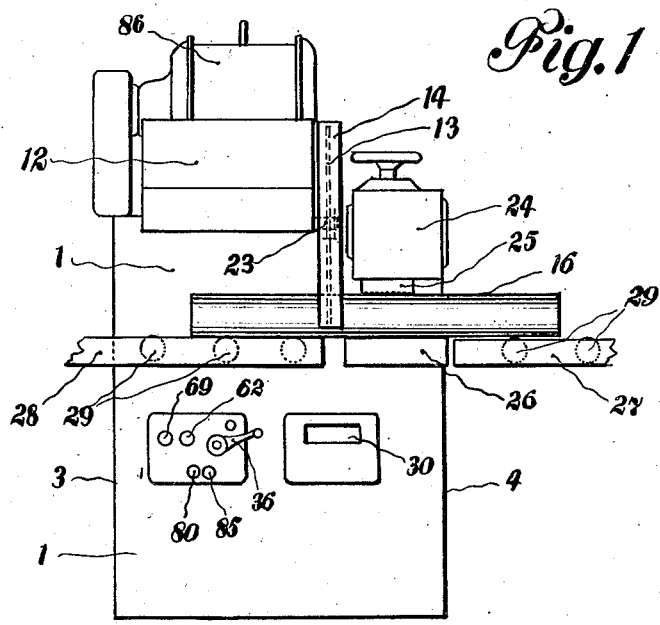
Fig. 1 is a front elevation of the saw embodying this invention.
Figure 2:
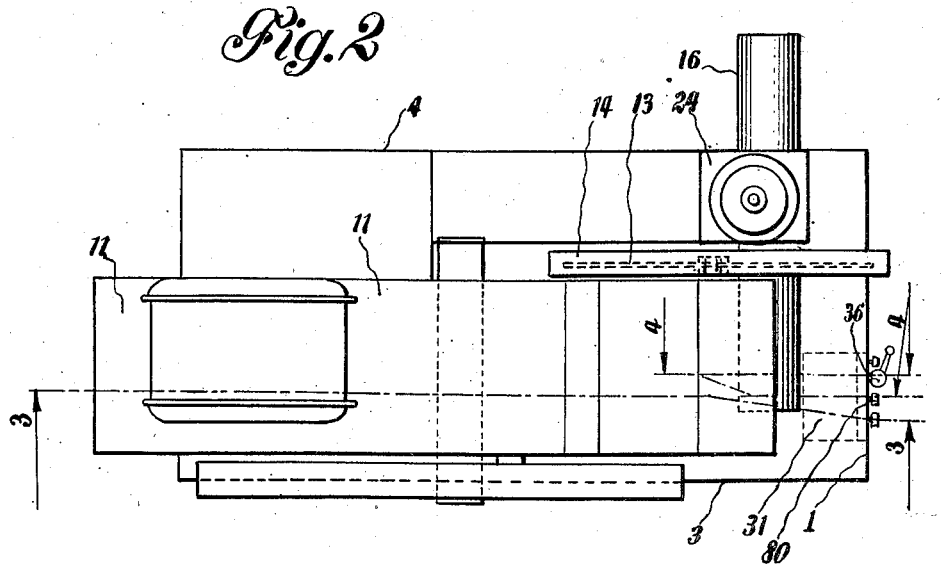
Fig. 2 is a top plan view thereof.
Figures 3, 4:
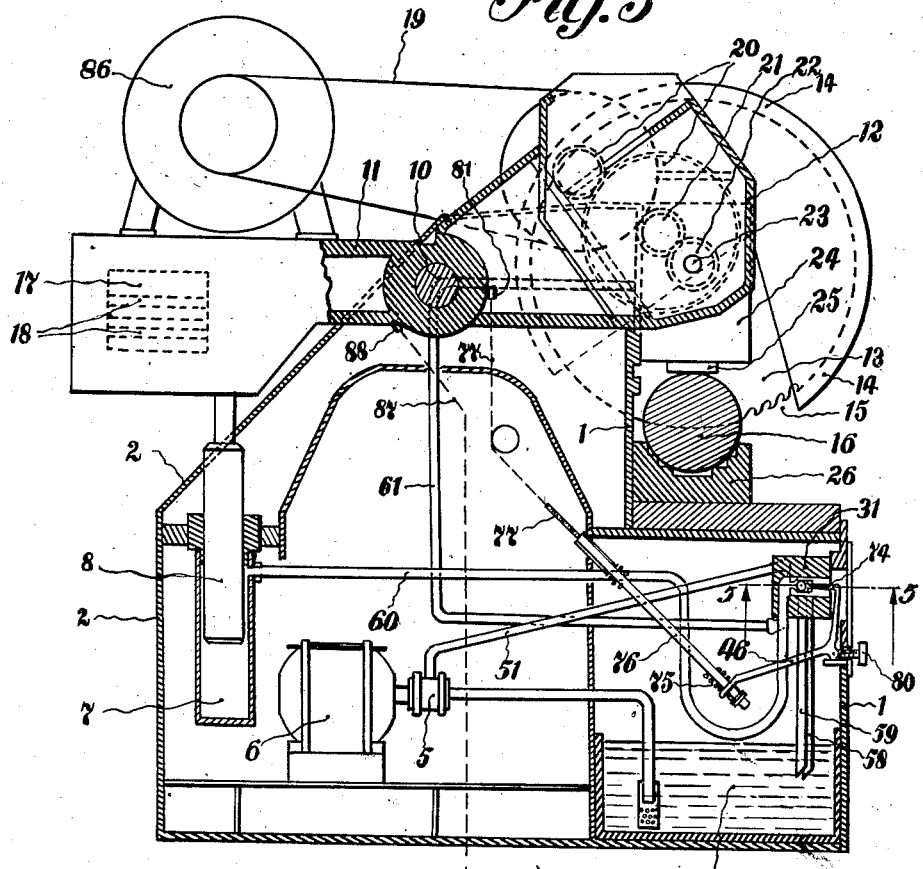
Fig. 3 is a vertical sectional elevation according to line 3—3 of Fig. 2.
Fig. 4 is a part vertical sectional elevation according to line 4—4 of Fig. 2.
Figure 5:
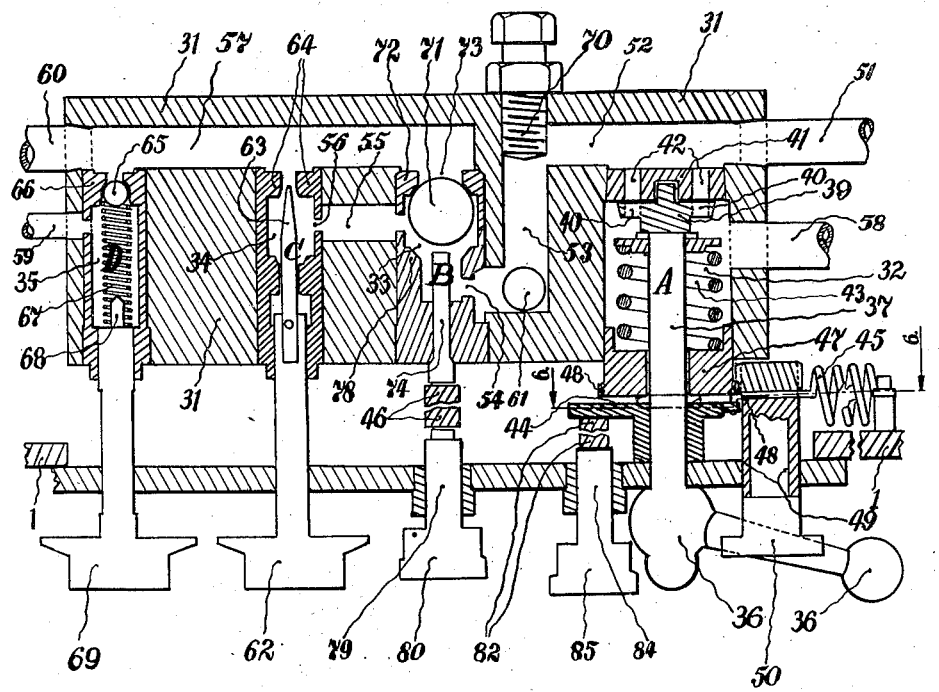
Figure 8:
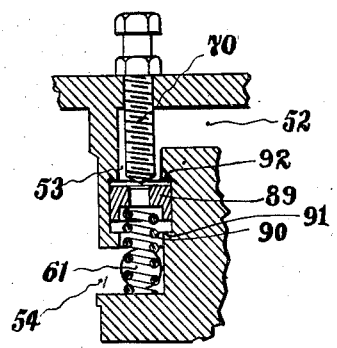

Fig. 5 is an enlarged horizontal sectional elevation according to line 5—5 of Fig. 3 showing the elements controlling the operation of the machine, Fig. 6 is a horizontal section elevation according to line 6—6 of Fig. 5, Fig. 7 shows on an enlarged scale certain members illustrated in Fig. 4 and Fig. 8 shows a second modification of certain parts illustrated in Fig. 5, serving to control the return speed of the swinging arm.

An encasing preferably made of welded steel plates and consisting of front wall 1, rear wall 2, side walls 3 and 4 houses oil pressure unit 5 with flanged motor 6, hydraulic feed cylinder 7 with piston 8 and oil reservoir 9.

A main shaft 10 is journaled in this housing; the shaft supports tiltable or swinging arm 11. the one end 12 of tiltable arm 11 carries the rotary cutter or saw blade 13 which is encased and protected by a cover 14 leaving an opening 15 for the billet 16 to be introduced into the machine.

The other end of the tiltable arm 11 is connected with and commanded by piston 8 of the hydraulic feed cylinder 7.

A cavity is recessed in swinging arm 11 which houses weight 18 intended to create a strong counter-pressure; it may be adjustable and preferably consist of a plurality of removable lead plates; it forms an important feature of the invention; it eliminates vibrations of the blade; it assists in the control of the vise; it accelerates the return stroke and helps greatly to obtain a neat smooth cut. Other essential advantages of this weight will be explained as this specification proceeds.

The motor 86 which rotates saw blade 13 is mounted on that end of tiltable arm 11 which is connected with piston 8. The rotation of the motor is transmitted to the cutter blade 13 by a belt 19 and a plurality of reduction gears 20, 21, 22; gear 22 is located on shaft 23 which carries saw blade 13.

A vise 24 having jaws 25 and 26 is provided to clamp billet 16; this vise is rigidly attached to the machine housing and operated by the same oil pressure system which commands the tiltable arm.

Billet 16 is conducted into the machine by suitable charging and discharging conveyors 27, 28 provided with conveyor rollers 29.

The chips travel downward with the saw blade and fall into chip drawer 30 which can be easily removed and emptied.

An important feature of this invention consists in the provision of means to automatically control the operation of the saw. These controlling members are shown in detail in Figs 5, 6, 7 and 8.

They are housed in a box 31 which preferably consists of a solid steel block provided with the necessary recesses.

Box 31 is secured to front wall 1 of the machine housing by a suitable fastening means.

The various controlling members are adjusted by knobs which can be operated from outside. A series of passages or bores 32, 33, 34, 35 is provided in control box 31 which house the valves A, B, C, D and other controlling members.

The operation of the saw is initiated by the rotation of one operating lever 36 mounted on the outwardly protruding end of shaft 37 of controlling member A; this controlling member A is located in bore 32. The turning of the lever interrupts the circulation of the pressure liquid from pump 5 to compartment 9 forming a reservoir for the operating liquid; lever shaft 37 carries at its one end a disc 39 provided with a plurality of symmetrically arranged orifices 40.

A second disc is rigidly mounted in the same bore 32 and adjacent to disc 39; a number of orifices 42 equal to those in disc 39 is provided in this control disc 41. Shaft 37 is surrounded by spring 43 which holds disc 37 in cooperative relation with disc 41; the orifices 40 and 42 of both discs are so arranged as to be moved in or out of alignment by the turning of the main lever.

Shaft 37 carries rotatable ratchet disc 44, Fig. 6, which is connected with and kept under tension of spring 45; ratchet 44 cooperates with tilting lever 82 controlling the work stroke, Figs. 4 and 7, in a manner which will be described in a later part of this specification.

The other end of spring 45 is rigidly connected with front wall 1; a nut 47 is located in bore 32 which is provided with teeth 48 at its circumference.

A short shaft 49 extending parallel to shaft 37 is located in front wall 1 adjacent to shaft 37; the inner end of this shaft meshes with teeth 48. A knob 50 is provided at the protruding end of shaft 49; the tension of spring 45 which is adjustable by rotation of the knob and corresponding rotation of nut 47 regulates the pressure of the oil current during the down stroke of the saw.

Bores and passages 51, 52, 53, 54, 55, 56, 57 conduct the pressure oil from the pump into the box, transport the same through the box and lead it to its various places of destination.

Tube 51, Figs. 3 and 5, leads the oil from pump 5 into box 31.

Bores 52, 53, 54, 55, 56, 57 transport the oil through the box; tubes 58, 59, 60, 61 lead the oil from control box 31 to the reservoir 9 to vise 24 and to feed cylinder 7.

C denominates a speed valve located in bore 34; it is constructed as a needle valve; it consists of shaft 63 which cooperates with seat 64. The valve is adjusted by knob 62; it forms a fine adjustment for the quantity of oil flowing from the pump to the feed cylinder and, therefore, influences the speed of the work stroke.

Valve D located in bore 35 consists of ball 65 cooperating with seat 66 and of a strong spring 67 surrounding shaft 68 which carries knob 69. The tension of spring 67 is so adjusted that it opens the valve when a certain predetermined maximum oil pressure develops in the system. The valve also releases the pressure caused by a decrease of the cutting speed when the blade encounters sections of the workpiece having a larger diameter.

Tube 59, Figs. 3 and 5, connects bore 35 with the oil reservoir.

Bore 61 branching off from bore 53 conducts the oil to the hydraulic vise 24.

Valve B located in bore 33 controls the return stroke of swinging arm 11; a ball 71 loosely located in the valve housing closes or opens passages 73. A pin 74 is movably located in bore 33; this pin is ordinarily rendered immovable by tilting lever 46 and compression spring 75 surrounding pull rod 76, Figs. 3 and 5; the pin is released only when the upstroke has been terminated.

Tilting lever 46 is connected with pull rod 76; this pull rod is connected by chain 77 with ear 81 fastened to swinging arm 11.

When swinging arm 11 approaches its highest position, tilting lever 46 is pulled away from pin 74; ball 71 which has been blocked by the pin may now be pressed on seat 78 by the return flow of the oil.

The highest position of the tilting arm 11 must be adjustable in conformity with the diameter of the saw and of the workpiece to be cut.

The adjustment is effected by adjusting screw 79; this screw as well as screw 84 are actually located in a lower level than the sectional elevation shown in Fig. 5; they are placed in the same elevation for clarity's sake only.

Adjusting screw 79 which is controlled by knob 80 abuts against oscillating lever 46; by displacing this screw towards the lever its swinging point is shifted; therefore, by a displacement of this screw the pull exerted on chain 76 is timely varied and the highest position of the swinging arm 11 equivalent to the termination of the upstroke of the saw may be regulated accordingly.

Similar means are provided for the adjustment of the down stroke, Figs. 4 and 7, and for the automatic return of the main lever into its inoperative position.

Ratchet 44 mounted on shaft 37 is blocked by tilting lever 82 which is linked to pull rod 86; the lever is by means of chain 87 connected with ear 88 fastened to swinging arm 11.

When the down stroke approaches its end, tilting lever 82 is pulled upward, ratchet 44 is released and main lever 36 is turned by spring 45 into the inoperative position; the two operating positions of lever 42 are shown in Fig. 7 in full and in dotted lines.

The adjustment of the lowest position of the tilting arms is effected similarly to the adjustment of the highest position by the rotation of screw 84 provided with knob 85 and connected with tilting lever 82, Fig. 4.

A screw 70 is provided to regulate the speed of the return stroke of swinging arm 11. By turning this screw the free cross area of the passage leading from bore 53 into bore 52 is increased or decreased; the return flow of the oil and in conformity therewith the speed of the return stroke is accordingly varied.

Another form of a speed regulating device for the return stroke is shown in Fig. 8; it is constructed as a check valve having an adjustable back flow. As long as the pressure in passage 52 is higher than in passage 54 check valve member 89 is displaced against the pressure of spring 90 until shoulder 91 is reached and a substantially unrestricted flow of the pressure medium is effected.

At the return stroke, after opening by-pass valve 40, 42, the pressure drops in passage 52 and check valve member 89 is now pressed by spring 90 against shoulder 92; thereby the flow of the pressure medium is restricted in dependence of the setting of screw 70.

The operation of the saw and of its essential parts described and shown in the drawings is performed as follows:

Main operating lever 36 is turned during the inoperative or rest period in a position where orifices 40 of disc 39 and orifices 42 of control disc 41 are in alinement and, therefore, form a free oil passage. The oil supplied by pump 5 through tube 51 into control box 31 passes in a continuous circulation through bore 52, orifices 40, 42, and discharge tube 58 into oil reservoir 9, Figs. 3 and 5.

When main lever 36 is manually turned into the operative position shaft 37 and disc 39 are rotated whereby the free passage of the oil into the reservoir is interrupted. The oil flows now through bores 52, 53, 54, 55, 56 into needle valve C, passage 73 being blocked by the pressure exerted on ball 71 of valve B by the oil current; the oil also flows into bore 61 branching off from bore 53 and leading to vise 24.

The quantity of oil passing from pump 5 through control box 31 into hydraulic cylinder 7 is controlled by the adjustment of knob 62 of valve C.

The oil entering the feed cylinder lifts piston 8 and causes the down or work stroke of the swinging arm.

The oil current passes valve D; if the oil pressure for some reason, for instance, undue increase of the cutting resistance or sudden pressure increase at the end of the return stroke, exceeds a predetermined maximum, ball 65 of valve D is displaced from its seat 66; the excess pressure is released thereby. The oil entering valve D flows through tube 59 into reservoir 9, Figs. 3 and 5.

The upward movement of piston 8 and the corresponding down stroke of the tilting arm and of the saw blade can be only effected after the counter-pressure has been overcome produced by the additional weight 18; the closure of the jaws 25, 26 of vise 24 and the tight clamping of the workpiece will, therefore, be accomplished before the work stroke of the tilting arm commences; this is an important function of weight 18.

The pressure liquid flows through valve C to cylinder 7; ball 71 of valve B remains on seat 72, as apparent from Fig. 5; the oil can pass to cylinder 7 only through valve C.

As soon as a predetermined pressure is reached and the counter-pressure exerted by weight 18 has been overcome, the swinging lever moves downward and the rotating saw blade is forced through the workpiece.

When the cut is terminated, the main lever is turned in the inoperative position by spring 45 and ratchet 44 which is disengaged from stop lever 82. Ratchet 44 which is rigidly mounted on shaft 37 of the main lever holds the latter in the operative position by means of tilting lever 82; when the saw blade has reached its lowest position this lever is oscillated by pull rod 86, chain 87 fastened to ear 88 and swinging arm 11; ratchet 44, Fig. 6, is thereby released; the main lever as well as control disc 41 are moved into the non-operative position by spring 45. The oil supplied by the pump flows now through orifices 40, 42 and tube 58 in the reservoir; weight 18 reverses the stroke of the swinging arm 11 and the saw is quickly moved upwards; the pressure thereby created in cylinder 7 forces the oil to flow from the cylinder through box 31 in a return direction; ball 71 is thereby removed from its seat 72 and the major part of the oil now does not pass through the needle valve C but flows through the larger cross area of opening 73 freed by the removal of ball 71 into the reservoir which helps to accelerate the speed of the return stroke. The oil pressure created by the heavy weight 18 during the return stroke of the saw keeps the workpiece clamped until the saw has been disengaged from the latter. The speed of the return stroke is adjusted by pin 70, Figs. 5 and 8.

During the return movement of swinging lever 11 ball 71 is held in a middle position by stop pin 74. This pin is blocked in the position shown in Figs. 3, 5, by tilting lever 46 and by compression spring 75 pressing against lever 46.

The disengagement of stop pin 74 which should interrupt the oil flow from cylinder 7 into the reservoir is caused by the oscillation of lever 46; this is accomplished by swinging arm 11, pull rod 76, chain 77 and ear 88, Fig. 3. If the predetermined highest position of the swinging arm is reached, the end of tilting lever 46 connected with pull rod 76 is raised; stop pin 74 is displaced by ball 71 and the latter pressed on seat 78; further passage of the oil beyond valve B is now prevented and the return stroke is terminated.

This phase of operation signifies the highest position of the saw blade; the same must be adjustable as it depends on the diameter of the saw blade used and on the size of the article to be cut; this adjustment is accomplished by rotation of knob 80, whereby the position of the tilting point of lever 46, and therefore the moment when the pull of chain 77 commences, is varied.

When upon the termination of the cut the saw blade has reached its lowermost position, the return movement of the main operating lever 36 from the operative to the inoperative position is automatically effected in a manner which is described previously. The pressure in passages 53, 61, and in the vise cylinder 24 now drops completely and the movable jaw 25 is then lifted by any suitable means, as for instance a spring.

The lowest position of the saw blade is adjusted by the rotation of knob 85 and displacement of screw 84 in the same manner as described in the operation of knob 80 and screw 79.

What I claim is:

1. A saw particularly for metals comprising in a housing a swinging arm, a saw blade carried by the one end of the arm, a hydraulic feed cylinder and a piston to effect the work stroke of the swinging arm, an operating liquid and means to supply the same to the cylinder at an elevated pressure, means to rotate the saw blade, means to clamp the workpiece, a weight provided at the other end of the swinging arm to create a permanent counterpressure, a plurality of elements operative upon the various working pressures to effect an automatic control of the operation of the saw, members to limit the work and the return stroke of the saw, said members including a tilting lever, means connecting the said lever with the swinging arm and operative thereby to tilt the lever and to terminate the pressure effecting the stroke of the swinging arm, and means to vary the tilting point of the lever.

2. A saw particularly for metals comprising in a housing a swinging arm, a saw blade carried by the one end of the arm, a hydraulic feed cylinder and a piston to effect the work stroke of the saw, a compartment for the operating liquid and a pump to supply the liquid to the cylinder at an elevated pressure, means to rotate the saw blade, a weight provided at the other end of the swinging arm to create a permanent counterpressure, a conduit connecting the pump with the hydraulic cylinder, elements connected with the said conduit and operative upon the varying working pressures created therein to automatically control the operation of the saw, a vise connected with the said conduit to clamp the workpiece, means to release the clamping pressure only after the return stroke has been completed, the said means including a valve having two seats, the inner valve space forming a part of the said conduit, a ball adapted to be displaced in the said inner valve space onto the one seat by the pressure liquid passing through the said conduit during the work stroke, a central movable pin projecting into the said inner valve space, to hold the ball in a position to permit the return of the pressure liquid through the said conduit during the weight operated return stroke and to hereby maintain the vise pressure, a tilting lever to block the pin during the return stroke of the saw, means operated by the swinging arm to tilt the lever and to thereby permit the release of the pin at the termination of the return stroke to close the second valve seat, to hereby interrupt the return flow of the pressure liquid and to release the vise pressure.

3. A saw comprising in a housing a swinging arm, a saw blade carried by the one end of said arm, means to rotate said saw blade, a vise to clamp the work piece, a system for the supply of pressure fluid, means to simultaneously apply said pressure fluid to the vise and to said arm to cause the clamping of the workpiece and to effect the work stroke of the saw blade, means to interrupt the pressure action of the fluid upon said swinging arm, a counterpressure weight associated with said arm to cause the return stroke of the saw and to maintain the clamp pressure until the disengagement of the saw blade from the work piece has been completed.

4. A saw comprising in a housing a swinging arm, a saw blade carried by the one end of said arm, means to rotate said saw blade, a vise to clamp the work piece, a system for the supply of pressure fluid, means to simultaneously apply said pressure fluid to the vise and to said arm to cause the clamping of the work piece and to effect the work stroke of the saw blade, means to interrupt the pressure action of the fluid upon said swinging arm, an adjustable counterpressure weight associated with said arm to cause the return stroke of the saw and to maintain the clamp pressure until the disengagement of the saw blade from the work piece has been completed.

5. A saw comprising in a housing a swinging arm, a saw blade carried by the one end of said arm, means to rotate said saw blade, a vise to clamp the work piece, a system for the supply of pressure fluid, means to simultaneously apply said pressure fluid to the vise and to said arm to cause the clamping of the work piece and to effect the work stroke of the saw blade, means to interrupt the pressure action of the fluid upon said swinging arm, a counterpressure weight associated with said arm to cause the return stroke and to maintain the clamp pressure until the disengagement of the saw blade from the work piece has been completed, and means to regulate the return speed.

6. A saw comprising in a housing a swinging arm, a saw blade carried by the one end of said arm, means to rotate said saw blade, a vise to clamp the work piece, a system for the supply of pressure fluid, means to simultaneously apply said pressure fluid to the vise and to said arm to cause the clamping of the work piece and to effect the work stroke of the saw blade, means to interrupt the pressure action of said fluid upon said swinging arm, a counterpressure weight associated with said arm to cause the return stroke and to maintain the clamp pressure until the disengagement of the saw blade from the work piece has been completed, the pressure exerted by said weight being of a magnitude to counteract the work stroke until a predetermined clamp pressure has been secured.

7. A saw comprising in a housing a swinging arm, a saw blade carried by the one end of said arm, means to rotate said saw blade, a vise to clamp the work piece, a system for the distribution of an operating fluid including a storage tank, and means to supply said fluid at an elevated pressure, means to simultaneously apply said pressure fluid to the vise and to said arm to cause the clamping of the work piece and to effect the work stroke of the saw blade, means to interrupt the pressure action of said fluid upon said swinging arm, a counterpressure weight associated with said arm to cause the return stroke and to maintain the clamp pressure until the disengagement of the saw blade from the work piece has been completed, and an adjustable valve located in said pressure system and responsive upon a predetermined maximum pressure to connect said pressure fluid system with said tank.

8. A saw comprising in a housing a swinging arm, a saw blade carried by the one end of said arm, means to rotate said saw blade, a vise to clamp the work piece, a system for the distribution of an operating fluid including a tank, and means to supply said fluid at an elevated pressure, a manually actuated controlling member to simultaneously apply said pressure fluid to said vise and to said arm to cause the clamping of the work piece and to effect the work stroke of the saw blade, means to automatically move said controlling member into the inoperative position, to interrupt thereby the pressure action of said fluid upon said swinging arm and to circulate the pressure fluid directly into said tank, and a counterpressure weight associated with said arm to cause the return stroke and to maintain the clamp pressure during the return stroke until the disengagement of the saw blade from the work piece has been completed.

9. A saw comprising in a housing a swinging arm, a saw blade carried by the one end of said arm, means to rotate said saw blade, a vise to clamp the work piece, a system for the supply of pressure fluid, means to simultaneously apply said pressure fluid to the vise and to the other end of said arm to cause the clamping of the work piece and to effect the work stroke of the saw blade, means to interrupt the pressure action of the fluid upon said swinging arm, a counterpressure weight associated with the other end of the arm to cause the return stroke of the saw and to maintain the clamp pressure until the disengagement of the saw blade from the work piece has been completed.

10. A saw comprising in a housing a swinging arm, a saw blade carried by the one end of said arm, means to rotate said saw blade, a vise to clamp the work piece, a system for the supply of pressure fluid, means to simultaneously apply said pressure fluid to the vise and to said arm to cause the clamping of the work piece and to effect the work stroke of the saw blade, means to interrupt the pressure action of the fluid upon said swinging arm, a force associated with said arm to cause the return stroke of the saw and to maintain the clamp pressure until the disengagement of the saw blade from the work piece has been completed.

11. A saw particularly for metals comprising in a housing a swinging arm, a saw blade carried by said arm, a hydraulic feed cylinder and a piston to effect the work stroke of the swinging arm, an operating liquid and means to supply the same to the cylinder at an elevated pressure, means to rotate the saw blade, means to clamp the work piece, a weight associated with said swinging arm to create a permanent counterpressure, a plurality of elements operative upon the various working pressures to effect an automatic control of the operation of the saw, members to limit the work and the return stroke of the saw, said members including a tilting lever, means connecting the said lever with the swinging arm and operative thereby to tilt the lever and to terminate the pressure effecting the stroke of the swinging arm and means to vary the tilting point of the lever.

12. A saw particularly for metals comprising in a housing a swinging arm, a saw blade carried by said arm, a hydraulic feed cylinder and a piston to effect the work stroke of the saw, a compartment for the operating liquid and a pump to supply the liquid to the cylinder at an elevated pressure, means to rotate the saw blade, a weight associated with said swinging arm to create a permanent counterpressure, a conduit connecting the pump with the hydraulic cylinder, elements connected with the said conduit and operative upon the varying working pressures created therein to automatically control the operation of the saw, a vise connected with the said conduit to clamp the work piece, means to release the clamping pressure only after the return stroke has been completed, the said means including a valve having two seats, the inner valve space forming a part of the said conduit, a ball adapted to be displaced in the said inner valve space onto the one seat by the pressure liquid passing through the said conduit during the work stroke, a central movable pin projecting into the said inner valve space, to hold the ball in a position to permit the return of the pressure liquid through the said conduit during the weight operated return stroke and to hereby maintain the vise pressure, a tilting lever to block the pin during the return stroke of the saw, means operated by the swinging arm to tilt the lever and to thereby permit the release of the pin at the termination of the return stroke to close the second valve seat, to hereby interrupt the return flow of the pressure liquid and to release the vise pressure.

MAX MEYERBACH.